Patented Sept. 13, 1949

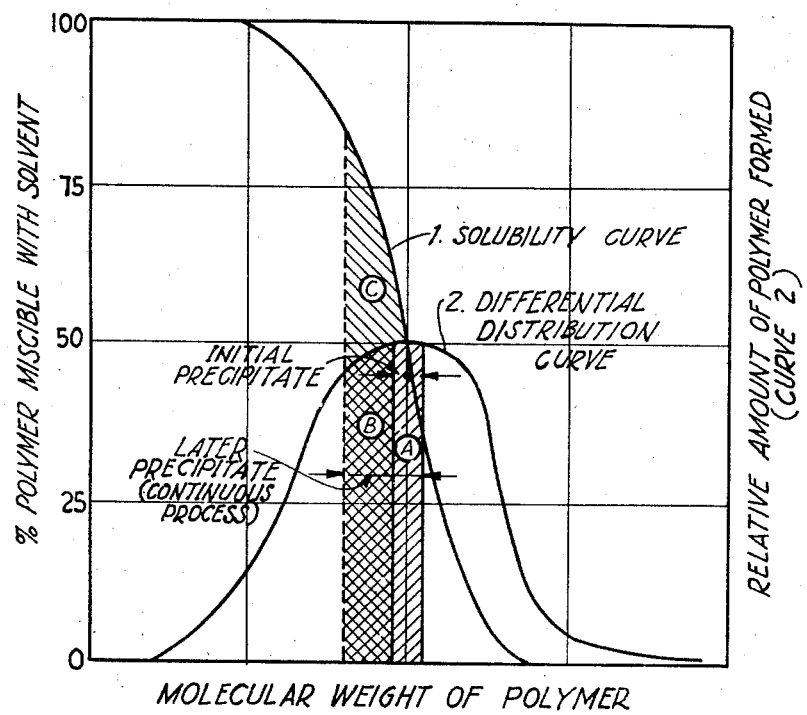
FIG. I
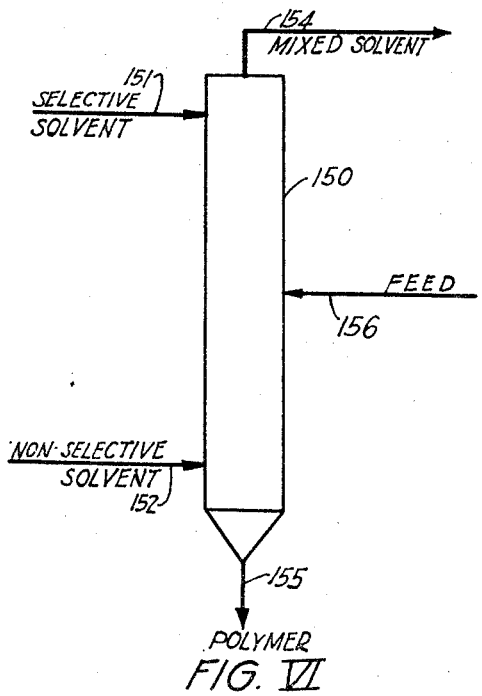
FIG. VI
INVENTORS
WILLIAM E. ELWELL
ALVAH L. SNOW
BY *[signature]*
ATTORNEY

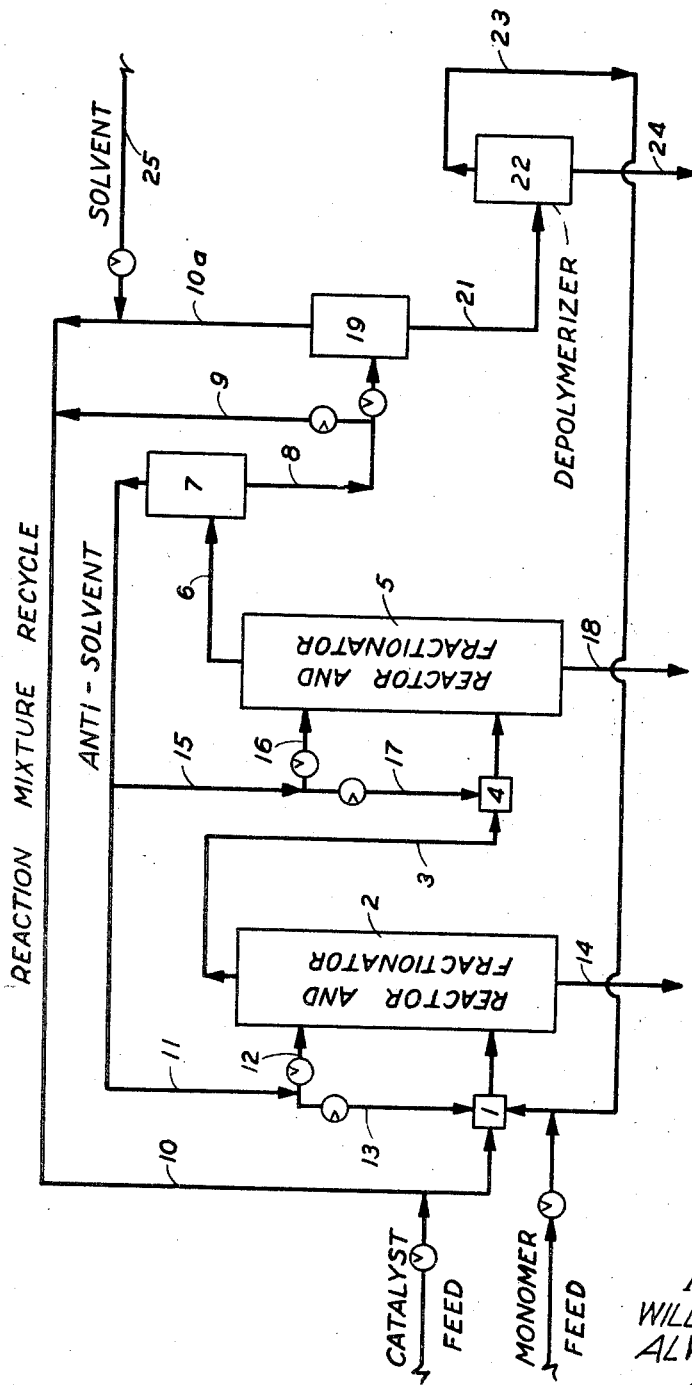
FIG. II

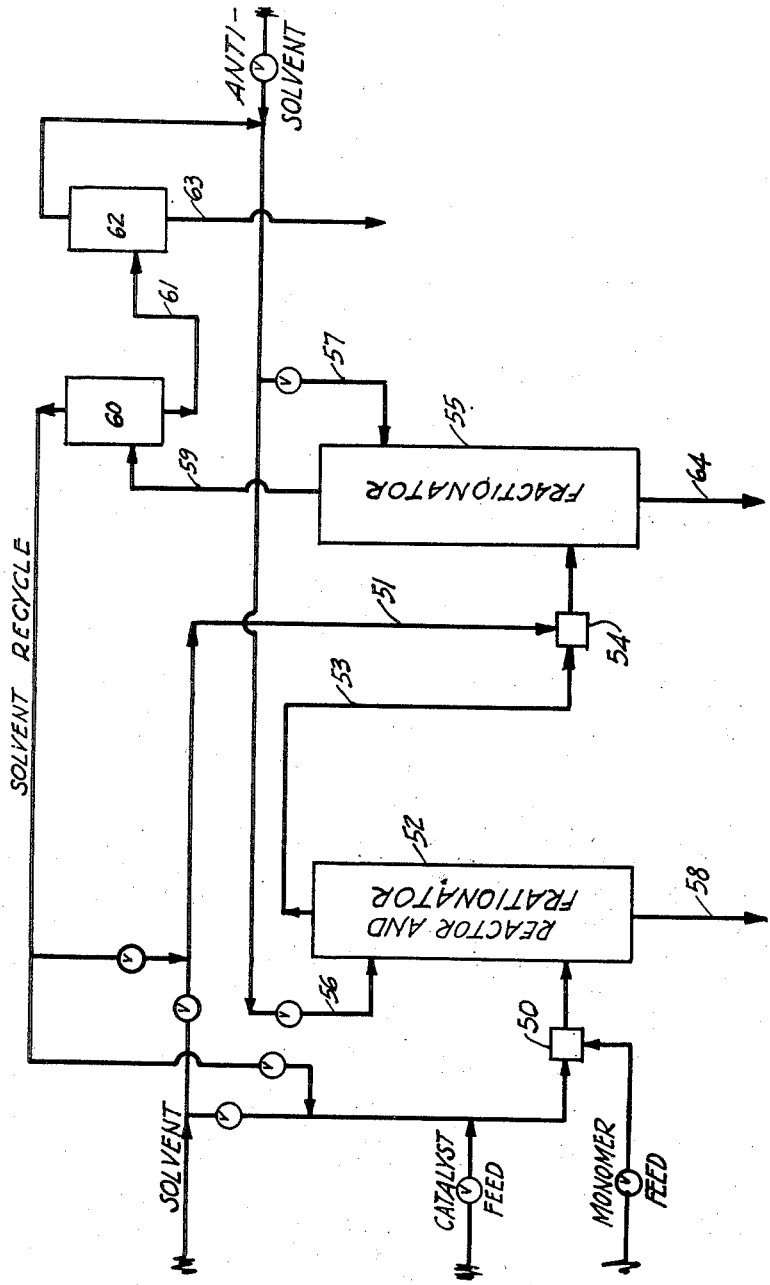

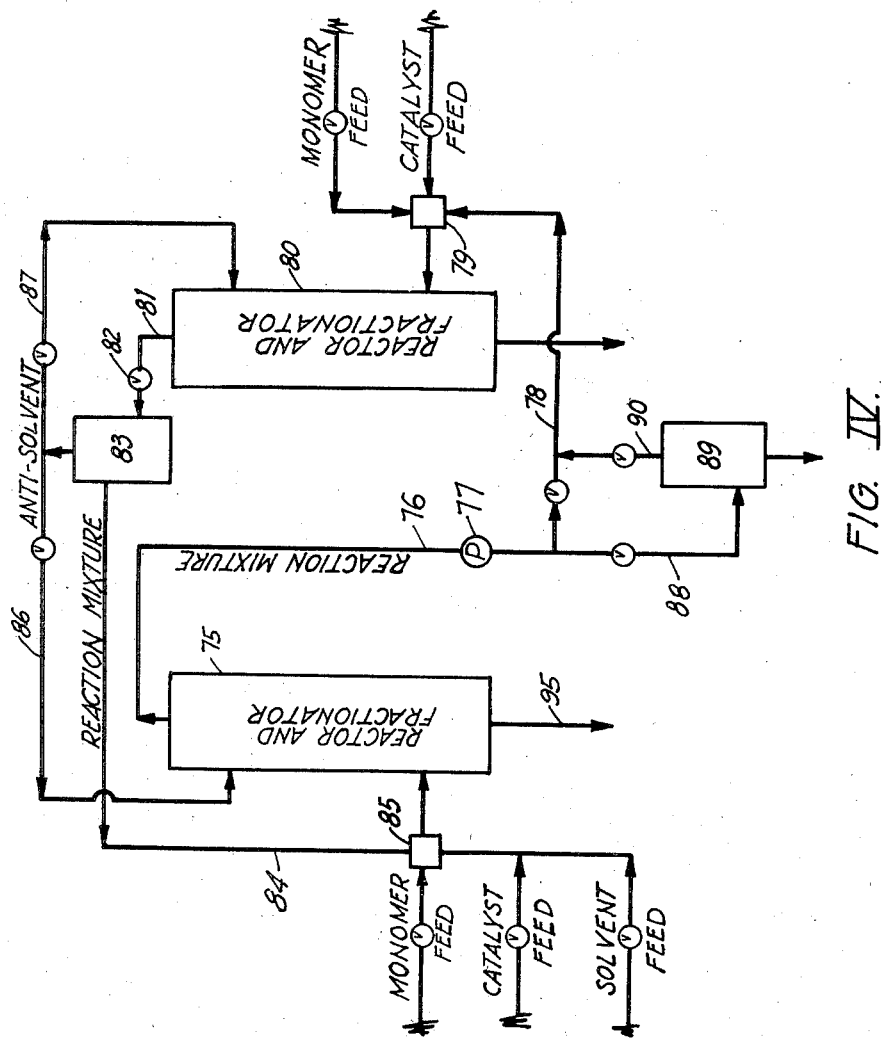

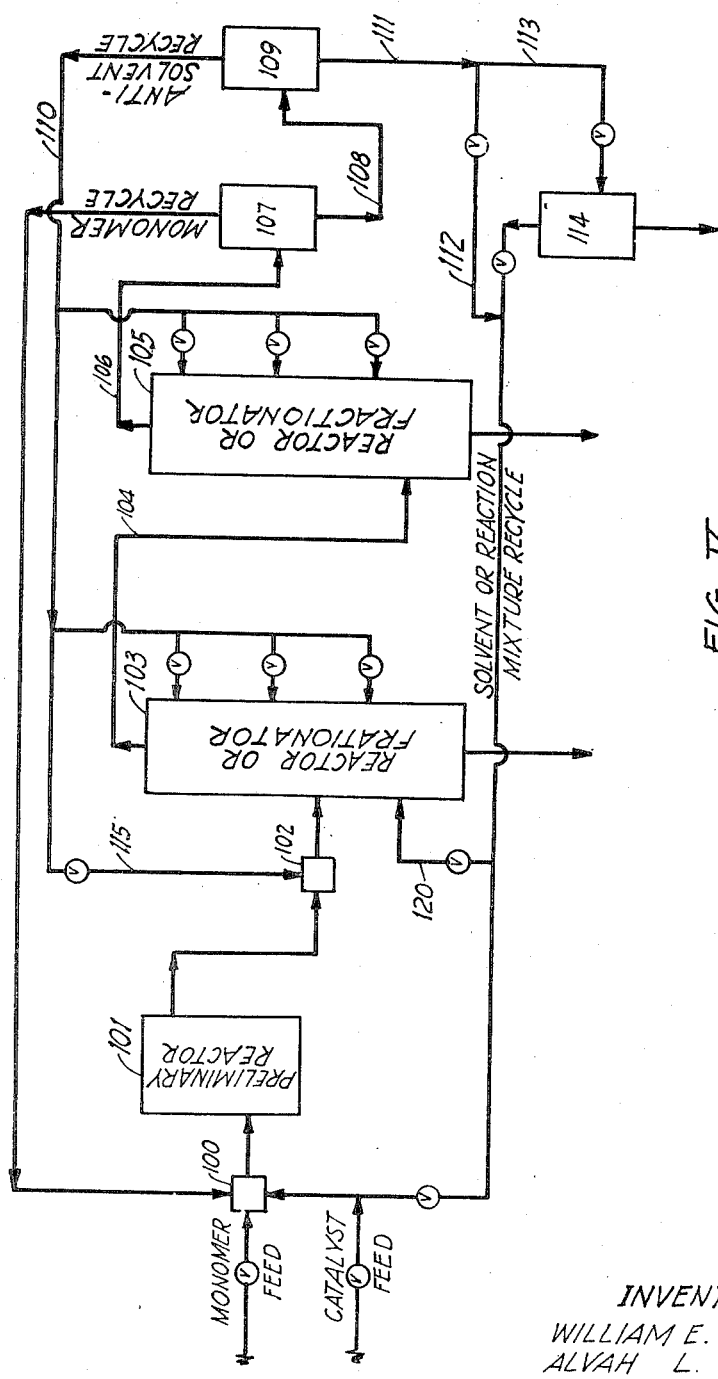

2,482,056

UNITED STATES PATENT OFFICE 2,482,056

POLYMERIZATION PROCESS

William E. Elwell and Alvah L. Snow, Berkeley, Calif., assignors to California Research Corporation, San Francisco, Calif., a corporation of Delaware Application June 19, 1945, Serial No. 600,244

13 Claims. (Cl. 260—80)

This invention relates to polymerization processes and more particularly to the polymerization and fractionation of resulting polymers in a continuous or a repetitive type process.

In polymerization reactions, particularly those effected by the opening of a carbon unsaturated bond, the chemical law of mass action does not control the molecular weight distribution or the yield of polymer product. On the contrary, molecular weight distribution, i. e., the relative amounts of polymer molecules within given molecular weight ranges, is determined by the relationship between the rate of activation of the monomer (i. e., activation of the molecular unit being polymerized) to start chain formation, the rate of chain growth or propagation, and the rate of chain termination. Thus, the differential distribution curve for a given polymer may approximate that of an ordinary probability function, although other shapes are known in which the symmetry of the normal probability curve is decidedly modified. (See, for example, Mark and Raff, High Polymeric Reactions, volume III, pp. 54, 55.)

Linear polymer mixtures have been separated into different molecular weight fractions by means of a selective solvent. Such selective solvents are known and are characterized by the fact that they possess a relatively high solvent power for a given type polymer of lower molecular weight on the one hand, and a relatively low or even negligible solvent power for the same type polymer of a higher molecular weight, on the other hand. That is to say, such a selective solvent will selectively dissolve lower molecular weight portions of a polymer mixture or, conversely, can be made to selectively precipitate higher molecular weight portions of a dissolved polymer mixture. This selective precipitation may be effected by decreasing the solvent power of the selective solvent after the polymer has been dissolved therein. A preferred method of reducing solvent power is by adding an anti-solvent for the polymer, said anti-solvent being miscible with the selective solvent. Another method of decreasing solvent power comprises cooling the selective solvent. In some respects it is desirable to form a selective solvent of predetermined solvent power by combining a suitable solvent and anti-solvent miscible with the solvent in the range of proportions to be utilized.

An object of the present invention is to provide a process of polymerization in a selective solvent which affords good control and relatively sharp fractionation of resulting polymer products.

Another object of the invention is to furnish an improved process for continuous or repetitive polymerization in a selective solvent.

A further object comprises the provision of an improved process for fractionating polymeric compositions.

Other objects and advantages of the invention will be apparent from the following disclosures and the attached drawing in which:

Figure I illustrates two typical basic curves showing variation in solubility and molecular weight distribution in a polymeric composition.

Figure II is a diagrammatic flow sheet of a multi-stage process utilizing a solvent and stepwise addition of an anti-solvent to vary solvent power in successive polymerization stages.

Figure III diagrammatically illustrates a process in which both solvent power and solvent ratio are varied in successive polymerization zones.

Figure IV shows a process in which solvent power temperature and pressure are varied in a polymerization process utilizing a volatile anti-solvent.

Figure V illustrates a process in which preliminary polymerization is followed by alteration of solvent power and fractionation of the polymer.

Figure VI is a flow diagram of a process utilizing the combination of a selective solvent, together with an auxiliary non-selective solvent, to effect fractionation, or polymerization and fractionation, of polymers according to molecular weight.

A study of polymerization reactions in a selective solvent reveals the phenomena illustrated in Figure I of the drawing. Referral to this figure discloses a typical solubility curve, 1, wherein average molecular weight of a linear polymer is plotted against per cent polymer miscible with a selective solvent. As will be observed, low molecular weight polymers are completely miscible with the solvent up to a given point and the solubility drops substantially to zero as molecular weight is further increased.

Curve 2 of Figure I is a typical differential distribution curve in which molecular weight of polymer is plotted against the relative amount thereof which is formed in a polymerization reaction. The molecular weight distribution here exemplified arises, as previously noted, from the three rate functions of monomer activation, chain growth, and chain termination.

When polymerization is effected in a selective solvent, a polymer chain tends to precipitate as it reaches a molecular weight above the solubility range, for example, the point of intersection of the solubility and molecular weight distribution curves in Figure I. Likewise, higher molecular weight polymers will not be formed where chain formation ceases on precipitation from the selective solvent. Hence, in a batch process with proper control of conditions, a relatively sharp fraction can be obtained as a precipitated polymer, provided dilute solutions are used. Such a sharp fraction is illustrated by Area A in Figure I.

In a continuous process, or in a batch process, wherein monomer is repeatedly added to the same selective solvent and polymer repeatedly precipitated, the product fractionation ceases to be relatively sharp and the polymer precipitated becomes less and less homogeneous. It has been found that this non-uniformity occurs because of the fact that for each molecule of polymer which is precipitated by reason of an original solubility limit, a predetermined number of lower molecular weight polymers are simultaneously formed. The concentration of these low molecular weight polymers, therefore, builds up until the solvent becomes saturated therewith (in the range of limited solubility) and thereafter these low molecular weight products will precipitate with the desired higher molecular weight fractions. This process of dilution with low molecular weight polymers may continue until an equilibrium point is reached, but in any event, a substantial modification in the product occurs as a continuous or a repetitive type polymerization type process progresses. For example, the concentration of low molecular weight polymer may build up to fill the area C of Figure I and the original product of area A will then be contaminated with an almost equal or even greater proportion of the low molecular weight polymer represented by area B in the drawing.

In some instances, the lower molecular weight polymer exerts a solvent effect on the higher polymer and the modification of the product will be in the direction of broadening molecular weight distribution into a higher zone to the right of area A in Figure I. In this case, the product likewise is not uniform and is relatively non-homogeneous in respect to molecular weight.

The process here provided affords production of a uniform and relatively homogeneous polymer in a continuous or a repetitive type of polymerization in a selected solvent. The process of this invention also provides better control and sharper fractionation of polymer products than is obtained by prior continuous polymerization processes.

Briefly described, a process utilizing the principles of this invention involves adding a polymerizable unsaturated compound to a solvent which has limited solvent power for polymers of predetermined molecular weights, passing the dissolved compound through at least one polymerization zone, selectively precipitating a higher molecular weight polymer in a first zone and forming a lower molecular weight polymer of limited solubility in the solvent, separating the selectively precipitated polymer from the reaction mixture, passing the remaining reaction mixture to a second zone before the concentration of the lower molecular weight polymer has substantially exceeded its solubility limit in said first zone, precipitating the lower polymer in the second zone in an amount at least about equal to that formed in the first and second zones; whereby, concentration of the lower polymer does not build up in excess of its solubility limit in the first polymerization zone upon recycling the reaction mixture thereto, separating the precipitated lower polymer and returning a reaction mixture from the second to the first polymerization zone.

Additionally, in accordance with this invention, polymers may be fractionated in a continuous manner by providing a selective solvent extraction zone which also may be a polymerization zone, passing polymer to be fractionated through the zone, passing a selective solvent through the zone in one direction, decreasing the solvent power of the selective solvent for higher molecular weight polymer in at least one portion of the extraction zone near the point of exit of the selective solvent whereby a part of the polymer is precipitated, passing the precipitated polymer countercurrently to the selective solvent and into a region of higher solvent power whereby the polymer is re-extracted to remove more soluble components which tend to precipitate with said higher molecular weight polymers, and removing undissolved fractionated polymers.

The foregoing and other significant features of the invention will be apparent from the following more detailed disclosure.

Figure II of the drawing illustrates a multi-stage continuous process wherein polymerization and polymer fractionation are effected in zones 2 and 5. Anti-solvent is introduced in each of these zones to effect fractionation in a desired manner and the residual reaction mixture is recycled after removal of anti-solvent or reduction of its concentration in the selective solvent.

Concentration of residual polymer in the selective solvent may be controlled by depolymerization, although this is unnecessary in various instances where the lower molecular weight polymers are further polymerized on recycling.

As indicated in the drawing, solvent, together with dissolved polymer, monomer and catalyst, is fed through mixer 1 to polymerization and fractionating unit 2. Polymerization occurs as the solvent and its dissolved components flow upwardly through reaction unit 2, and a mixture of lower, intermediate and higher molecular weight polymers is formed. Selective precipitation of higher molecular weight polymers is effected by controlling the solvent power of the selective solvent in this first polymerization zone. As here shown, solvent power is reduced in the top of unit 2 by introduction of an anti-solvent through valve controlled line 12. Admission of anti-solvent to the solution at this point affects a fractional precipitation of the polymer formed in the vessel. The precipitated polymer then flows down the tower, encountering upward flowing selective solvent and is redissolved to the extent that it is soluble. This redissolved polymer again flows upwardly to the precipitation zone where it is once more fractionated by the action of the anti-solvent. This repeated fractionation by partial solution and precipitation effects a better separation of relatively soluble (lower) and relatively insoluble (higher) polymers, thereby yielding a more homogeneous product.

In order to reduce the initial solvent power of the selective solvent admitted to the bottom of unit 2, anti-solvent also may be admitted in desired amounts through valve controlled line 13 to mixer 1. This initial addition of anti-solvent will limit the solvent power of the reaction mixture in the lower portion of reactor 2 and tends further to determine the type of polymer formed during the first stage of the polymerization reaction. This is desirable in some instances, as where the unmodified solvent phase favors the formation of a product having a molecular weight higher than is preferred in a particular case.

The precipitated polymer product, after repeated fractionation as above described, collects in the bottom of reactor 2, from which it may be removed through line 14 and suitably purified by separation from entrained solvent, anti-solvent and monomer. Components recovered from this purification may be returned to the system.

In the meantime, selective solvent, together with dissolved monomer and low and intermediate molecular weight polymers, continues to progress to the top of reactor 2. This reaction mixture and added anti-solvent then flow by way of line 3 through mixer 4 to the second polymerization and fractionation stage. The solution from mixer 4 is introduced into the bottom of second stage reactor 5 and flows upwardly therethrough. Further polymerization desirably is effected in this second stage of the process to form additional low and intermedaite molecular weight products.

The intermediate molecular weight polymer is precipitated and fractionated in reactor 5, as polymerization progresses, and introduction of an anti-solvent through valve controlled line 16 into the top of said reactor determines the lower molecular weight limit of polymer precipitated. The action of this anti-solvent and the repeated precipitation and solution of polymer is similar to that described in the first stage of the process. Likewise, anti-solvent may be added to mixer 4 by means of valve controlled line 17 to initially lower the solvent power of the selective solvent in the second stage of the process. The total amount of the anti-solvent introduced in the second stage of the process preferably is controlled so that the intermediate molecular weight polymer is precipitated to the point where concentration thereof in the solvent will not exceed its solubility limit upon return of the reaction mixture to reactor 2. In other words, the amount of intermediate polymer precipitated in reactor 5 preferably should equal the amount formed in both reactors 2 and 5 in order to prevent a build-up in concentration of the polymer and eventual precipitation in reactor 2 which would otherwise occur upon continuous recycle of reaction mixture from unit 5 to unit 2. This last precaution becomes unnecessary when the depolymerization feature of the process is utilized, since residual dissolved polymer is thereby removed.

Lower molecular weight polymers, in many cases, are completely miscible with the selective solvent and will reach an equilibrium point by reason of further polymerization on recycle. In any event the completely miscible polymers do not precipitate and can be removed, if desired, by depolymerization or other suitable methods.

Precipitated polymer of intermediate molecular weight collects in the bottom of second stage reactor 5 and is removed through line 18. Separation from entrained reaction mixture may be effected in any suitable manner.

Low molecular weight polymer, solvent and anti-solvent finally flow from the top of reactor 5 through line 6 to separator 7 where anti-solvent is at least partially removed and recycled through lines 11 and 15 to reactors 2 and 5. Preferably, the anti-solvent originally is selected so that it will be more volatile than the selective solvent and may be separated by a simple vaporization step. The anti-solvent may contain some monomer, depending upon the completeness of polymerization and upon the relative volatility of these two components.

The remaining reaction mixture may be recycled from separator 7 to the first polymerization stage by way of outlet line 8, valve controlled return 9, and recycle line 10. This recycle reaction mixture preferably receives fresh catalyst feed prior to blending with the monomer feed as here illustrated in the drawing.

Due to the fact that the selective solvent ultimately may be contaminated with various reaction residues, the reaction mixture from separator 7 and outlet line 8 may be subjected to a purification treatment intermittently or a part of the mixture may be treated continuously, as desired. As here shown, the reaction mixture to be purified is by-passed from outlet line 8 to separator 19 and the selective solvent volatilized from higher boiling residues. Such residues may comprise, for example, low polymers, catalyst decomposition products and the like. The vaporized solvent from separator 19 is condensed and returned to the system by way of line 10a. Likewise, fresh solvent may be introduced through solvent inlet 25.

Provision is made in the process of Figure II for depolymerizing low molecular weight polymer by passing residue from separator 19 by way of line 21 to depolymerizer 22. The low polymers may be depolymerized by suitable known methods. For example, polystyrene can be depolymerized by heat and distillation. The monomer formed in depolymerizer 22 is separated and may be returned as feed through line 23. Catalyst residues, tars and the like from depolymerizer 22 may be discarded through line 24.

The process exemplified in Figure II affords close control of the type and molecular weight of polymer obtained. In reactor 2, for example, the polymer will have a relatively narrow molecular weight range as determined by difference in solubility in the solvent composition admitted to the bottom of the reactor, as an upper limiting factor, and solubility in the solvent diluted with anti-solvent in the top of the reactor, as a lower limiting factor. Likewise, the intermediate polymer separated in reactor 5 will be of a molecular weight range determined by differences in solubility in the modified solvent from the top of first stage reactor 2 on the one hand, and the total dilution of the solvent in second stage reactor 5, on the other hand. Continuous and relatively uniform operation is possible, since proper control of solvent and anti-solvent ratios in unit 5 prevents the build-up in concentration of intermediate or low polymers which might otherwise occur and cause gradual precipitation thereof on recycle to the first stage of polymerization.

Illustrated in Figure III is a second process utilizing a system in which ratio of solvent to polymer, as well as solvent power, is altered to effect and control polymerization and fractionation. In this example, an anti-solvent less volatile than the solvent is utilized and thereby permits selective removal of the solvent and alteration of solvent ratio by recycle thereof to different stages. As here shown, there is provided a multi-stage continuous process wherein polymerization and polymer fractionation are effected in a first reactor 52 and a second fractionator 55. Anti-solvent is introduced in each of these zones to effect fractionation in a desired manner, and solvent ratio is varied by introduction of additional selective solvent into the feed of second fractionator 55.

More specifically, reference to Figure III will reveal that solvent, catalyst and monomer are fed through mixer 50 to the first polymerization and fractionating unit 52 where polymerization occurs as the solvent and its dissolved components flow upwardly through the reactor. A mixture of lower, intermediate and higher molecular weight polymers is formed, and selective precipitation of the higher polymers is effected by reducing the solvent power of the selective solvent in the upper portion of this first polymerization zone. As here indicated, solvent power is controlled by introduction of an anti-solvent through valve controlled line 56. Admission of the anti-solvent to the solution at this point effects a fractional precipitation of the polymer followed by solution and repeated precipitation of borderline polymers, as described in connection with the corresponding stage of the process of Figure II.

The precipitated polymer product is collected in the bottom of reactor 52 and removed through line 58. The polymer may be suitably purified by a separation from entrained solvent and other impurities.

As the selective solvent, together with dissolved polymers, progresses upwardly through reactor 52, it is blended with anti-solvent added through line 56, as previously indicated. This blended solution flows from the top of reactor 52 by way of line 53, mixer 54, to the second stage fractionator 55. Additional solvent is admitted to the bottom of this second fractionator through line 51 and mixer 54. Anti-solvent is introduced through valve controlled line 57 at the top of the fractionator, as in previous instances. Addition of solvent to the bottom of fractionator 55 tends to promote the formation of at least some polymer having a molecular weight overlapping the lower molecular weight range of the higher polymer precipitated in the first stage 52. However, time intervals and conditions may be controlled so that no material polymerization occurs in fractionator 55, in which event the principal function of the added selective solvent is to produce a more dilute solution and thereby effect a sharper fractionation of polymer by the addition of anti-solvent through line 57. (Dilute solutions have been found to yield sharper fractionation.)

Thus, by controlled addition of anti-solvent to reactor 52 through line 56, a relatively high molecular weight polymer fraction may be separated and removed through line 58, and by further addition of solvent to the bottom of second stage fractionator 55 and of anti-solvent near the top thereof, lower average molecular weight polymers may be fractionated and recovered through line 64. The feature of promoting additional higher molecular weight polymer in the second stage unit 55 is advantageous where a somewhat broader molecular weight range is desired in the polymer obtained from this stage of the process. Again, however, anti-solvent addition in fractionator 55 preferably should be sufficient to reduce the concentration of those polymers which are only partially miscible with the selective solvent, to a point where precipitation thereof will not occur in initial reactor 52 when and if the reaction mix is recycled.

The solvent, anti-solvent and any dissolved materials pass from fractionator 55 through line 59 to separator unit 60 where the more volatile solvent is vaporized, condensed, and recycled to initial feed and to second stage mixer 54. Anti-solvent and other less volatile residues flow from separator 60 through line 61 to a second separating unit 62 where anti-solvent is vaporized and recycled to the reaction and fractionation units. The remaining less volatile material is removed from separator 62 through line 63, and in suitable cases may be returned to feed or depolymerized, as described in connection with the process of Figure II. Although, as here shown, the solvent and anti-solvent are completely separated and purified before recycle, it is possible, when desired, to split the effluent from second stage fractionator 55 and purify only a portion thereof in the manner shown while returning the remainder to initial feed at mixer 50 or to second stage feed through mixer 54.

Figure IV of the drawing illustrates a multi-stage continuous process wherein a pressure differential is maintained between two stages and wherein a temperature differential likewise may be effected. In this type of process it is preferred to utilize an anti-solvent sufficiently volatile to create a superatmospheric pressure under the temperature conditions existing in at least one of the stages of the process. Controlled release of the anti-solvent pressure and the resulting vaporization thereof are then utilized to maintain a relatively lower temperature in the process stage to which the cooled reaction mixture is recycled.

As indicated in the drawing, monomer and catalyst feed are introduced into a recycled solvent and reaction mixture by way of mixer 85. Fresh solvent likewise may be introduced at this point, as desired. The recycled solvent and reaction mixture, together with fresh monomer and catalyst feed, flow from mixer 85 to the bottom of a first stage reactor and fractionator 75. Polymerization occurs as the solvent and its dissolved components flow upwardly through this reaction unit and a mixture of polymers of different molecular weights is formed. Selective precipitation of higher molecular weight polymers is effected by controlling the solvent power of the selective solvent in this first polymerization zone. As here shown, solvent power is reduced in the top of unit 75 by introduction of an anti-solvent through valve controlled line 86. Admission of anti-solvent to the solution at this point effects a fractional precipitation of the higher polymers formed in this reaction stage. The precipitated polymer then flows down the tower and is redissolved and reprecipitated to obtain fine fractionation, as previously indicated.

The fact that the reaction mixture has been cooled, in a manner to be subsequently described, maintains the average temperature of reactor 75 below that which would otherwise exist. This temperature effect may be utilized to direct the polymerization reaction. For example, in various acid catalyzed polymerizations, reduced temperature increases molecular weight, and in peroxide catalyzed reactions, reduced temperature may also increase the average molecular weight of the polymer formed, but usually substantially decreases the polymerization rate. In other words, it will generally be found that reduction in temperature in the first stage may be used with greater advantage to control primarily reaction rate in peroxide catalysis on the one hand, and molecular weight of polymer in acid type catalysis on the other hand. However, these two temperature dependent variables are not ordinarily completely separable.

The precipitated and fractionated polymer product of reactor 75 collects in the bottom thereof and may be removed as indicated at 95 in the drawing. In the meantime, selective solvent, together with dissolved lower molecular weight polymers, progress to the top of first stage reactor 75 and this reaction mixture, together with added anti-solvent, then flows by way of line 76, pump 77, and line 78, through mixer 79 to the second polymerization and fractionation stage which is maintained under a higher pressure than that of the first reactor 75. The solution from mixer 79 is introduced into the bottom of reactor 80 and flows upwardly therethrough. Further polymerization desirably is effected in this stage of the process to form additional lower and intermediate molecular weight polymers. Additional monomer and catalyst accordingly may be fed to reactor 80 through mixer 79 in order to obtain greater versatility in the relative yields of polymer produced in this second unit. Thus, a larger amount of the intermediate or lower polymer, or both, may be obtained in unit 80 by feeding additional monomer and catalyst thereto without unbalancing the system, since controlled addition of anti-solvent to reactor 80 will reduce the concentration of the intermediate and lower polymers to a point where precipitation or contamination of the higher polymer with the lower polymer need not occur in reactor 75.

It should be noted that a portion of effluent form pump 77 may be bypassed through valve controlled line 88 to a suitable separating system 89 where purification and removal of catalyst residues, etc., may be effected either periodically or continuously, as desired, and the solvent and anti-solvent and reaction components returned to the system through valve controlled line 90. This is desirable where the solvent becomes contaminated with non-volatile catalyst residues, tars and the like.

The reaction mixture from the top of second stage fractionator 80 passes through line 81 and pressure reducing valve 82 to vaporizer unit 83 where anti-solvent is vaporized as a result of the reduced pressure. This pressure simultaneously reduces the temperature and anti-solvent content of the recycle mixture. Relatively large amounts of anti-solvent may be vaporized to remove heat by self-refrigeration and maintain a temperature differential between the two reactors. The residual recycle mixture from vaporizer 83 is returned through line 84 and mixer 85 to reactor 75, as previously described. Anti-solvent from vaporizer 83 is re-introduced into reactors 75 and 80 through valve controlled lines 86 and 87, respectively. Suitable devices for compressing, condensing and recirculating anti-solvent and solvent will, of course, be provided.

When polymerization is slow or its initiation is delayed by a substantial induction period, a preliminary reactor may be provided with advantage. Likewise, where the anti-solvent tends to inhibit activation of the monomer and initiation of polymerization, the provision of a preliminary reactor will be found useful. This feature of the invention is illustrated in the flow sheet of Figure V.

In the process of Figure V, monomer and catalyst, together with recycle solvent, are fed through mixer 100 to a preliminary reactor 101 where initial polymerization or activation of the monomer is effected. The reaction mixture from preliminary reaction unit 101 flows through mixer 102 to a first fractionator 103. A series of polymer fractionations is effected in this first fractionator by admission of anti-solvent at a plurality of points along the path of the solvent as it flows upwardly therethrough. Solvent and dissolved reaction mixture, together with added anti-solvent, then pass from the first fractionator 103 through line 104 to a second fractionator 105 where further plural fractionation of dissolved lower polymer is likewise obtained. Solvent and residual materials retained in solution, together with anti-solvent, then flow from the top of this second fractionator through line 106 to a separator 107.

In this system, solvent and anti-solvent have been selected so that the monomer is the most volatile component. This permits removal of any unpolymerized monomer by vaporization in separator 107 and recycle of the vaporized monomer with or without condensation to initial feed mixer 100. Preferably, the anti-solvent is selected so that it is the next most volatile portion of the reaction mixture, and this component is accordingly separated by passing the unvaporized mixture from unit 107 through line 108 to a second separator 109 where anti-solvent is obtained as overhead, condensed and recycled through line 110 to the desired points in reactors 103, 105, etc. The residual less volatile components of the reaction mixture now flow from the anti-solvent separator 109 through line 111 and may pass either directly to feed by valve controlled line 112 or be entirely or partially by-passed through line 113 to separator 114 where solvent may be vaporized and returned either to feed or to the bottom of reactor 103 by way of line 120. This system has a number of advantages in that it is only necessary to vaporize residual monomer and anti-solvent for recycle purposes. Since the solvent is usually the larger component of the system, continuous vaporization and recycle thereof requires an increased expenditure of heat which may raise the over-all cost of operation.

Another feature of the process of Figure V involves the introduction of reaction mixture from preliminary reactor 101 and mixer 102 into the first stage fractionator 103 at a point where the anti-solvent content of the solvent from mixer 102 most nearly approaches the anti-solvent content of the solvent in reactor 103. Thus, anti-solvent content in reactor 103 increases progressively up the tower as anti-solvent is repeatedly admitted along the line of flow of the solvent, and the reaction mixture is introduced in that zone of reactor 103 where an equivalent concentration of anti-solvent is to be found. Where additional solvent is added through line 120 to the bottom of the fractionator, this point of equivalent anti-solvent concentration will be above the bottom of the fractionator, as indicated in Figure V, and somewhere in the zone of anti-solvent addition. Also, by providing preliminary reactor 101 and subsequently introducing anti-solvent through valve controlled line 115 into mixer 102, preliminary formation of a higher polymer may be promoted. At the same time, a further improvement in fractionation may be obtained by adding anti-solvent at a plurality of points in fractionators 103 and 105, to increase the number of extractions and precipitations and effect a sharper separation of polymers.

In the flow sheets and descriptions of this specification, no attempt has been made to set forth features such as valves, pumps, condensers, fractionating distillation columns, heat exchangers, and the like, which are utilized in an industrial plant. Likewise, the systems have been described on the assumption that the specific gravity of the polymer is greater than that of the reaction mixtures whereby gravity separation and settling of precipitated polymer is obtained. In those cases where the specific gravity of the precipitated polymer is less than that of the reaction medium, the reactors or fractionators and connections thereto may be inverted to adapt the system to a reverse direction of flow. Likewise, in those instances where the specific gravity of the polymer is not sufficiently different from that of the reaction medium, the precipitate may be moved in the desired direction by suitable mechanical means. The various systems described also may be adapted to relative changes in volatility of the solvent, anti-solvent and monomer so that upon separation by vaporization or the like, the respective components are returned or recycled to the indicated points.

type of concentration of monomer, temperature, etc., present interlocking variables which can be adjusted and correlated over relatively wide ranges to yield products of widely different properties without departing from the general principles of the process. Because of the variety and range of the variables, numerical values cannot be assigned in properly defining the invention. The following data on individual solvents, anti-solvents, polymers and the like are given for illustrative purposes.

Polyvinyl chloride is an example of a polymer which has been classified (U. S. Patent No. 1,791,009) into a number of forms based on solubility characteristics and order of occurrence during polymerization. Some solubility characteristics are listed below:

*Table I*

| Solvent | Alpha | Polymer Beta | Delta | Gamma |
|---|---|---|---|---|
| Ethylene | Dissolves | Dissolves | Swells slightly | Insoluble. |
| Acetone | do | Insoluble | | Do. |
| Ethyl methyl ketone | do | Dissolves slightly | | Do. |
| Trichlorethylene | do | do | | Do. |
| Tetrachloroethane | do | Dissolves | Swells rapidly | Do. |
| Chlorobenzene | do | do | Insoluble | Do. |
| Ethyl ether | do | | | |
| Methyl alcohol | do | | | |

It has been found that sharper fractionation of polymers is obtained in relatively dilute solutions. For this reason, the processes should preferably be operated so that the ratio of solvent to polymer is high, for example, 10:1 or greater in the fractionation zones. This does not mean that the concentration of monomer necessarily need be correspondingly low since correlation of catalyst feed rate, contact time, temperature, etc., may permit high monomer concentration with relatively low polymer concentration in the reaction medium.

The process is particularly adapted to polymerization and fractionation of vinyl or other polymerizable carbon to carbon unsaturated compounds. Examples of vinyl compounds to which the process is applicable are vinyl chloride, vinyl acetate, vinyl chloride-vinyl acetate copolymers, styrene, acrylic acid esters, vinyl ethers and the like. Analogous compounds, such as methacrylic acid esters, also are exemplary of suitable polymerizable carbon-to-carbon unsaturated compounds. Representative of other unsaturated compounds are isobutene and other olefins of 2 to 5 carbon atoms, vinylidene chloride, chloroprene and methallyl chlorides. Copolymerization of butadiene and isobutene may be effected and controlled by the process.

The process also is applicable to the production and fractionation of polymers or copolymers with a given amount of cross-linking between polymer chains. Thus, unsaturated compounds with two non-conjugated double bonds such as divinyl ether, acrylic ester of allyl alcohol, divinyl benzene, and methacrylic ester of unsaturated alcohols have been copolymerized with vinyl compounds to produce cross-linking. Solubility of such copolymers decreases as cross-linking increases and the present process can be utilized to precipitate the copolymer at the desired stage of cross-linking while simultaneously fractionating out other components of the reaction mixture.

It will be apparent that the process is such that solvent ratios, anti-solvent proportions, catalyst rate and type, catalyst contact time, Examples of solvents and anti-solvent combinations adapted to use in the polymerization of vinyl chloride according to the principles of the process are:

*Table II*

| Solvent | Anti-solvent |
|---|---|
| Ethylene dichloride | Methyl alcohol. |
| Do | Ether. |
| Chlorobenzene | Methyl alcohol. |
| Do | Ether. |
| Orthochlorophenol | Water. |
| Acetone | Do. |
| Ethyl alcohol | Do. |
| Vinyl chloride (excess) | Propane. |
| Ethylene dichloride | Do. |
| β β' dichlorethyl ether | Do. |
| Orthochlorophenol | Do. |

In general, the foregoing combinations are also adapted to copolymerization of a major proportion of vinyl chloride with a minor proportion of vinyl acetate according to the principles of the process here proposed.

*Example 1.*—Vinyl chloride and ethylene dichloride in the ration of 1 to 4 are introduced into a polymerization zone together with a small proportion (e. g., 0.05 to 0.5%) of acetyl or benzoyl peroxide. Normal butane is an amount of from 0.5 to 2.0% in liquid phase may be added to the feed mixture as an anti-solvent. As polymerization proceeds the reaction mixture progresses through the polymerization zone and anti-solvent is added to bring the total amount present up to from 3 to 5%. Where a broader range polymer is desired in the precipitated product, the total anti-solvent introduced into the reaction mixture in this zone may be as much as 10% or more. Precipitated polymer is separated by gravity centrifuging, filtration, or any suitable means and the reaction mixture is passed to a second zone where additional anti-solvent is incorporated, e. g., up to 20% or more to precipitate additional polymers. After separation of this precipitated polymer, remaining reaction medium is passed to a separator where butane and any vinyl chloride monomer are vaporized and returned to the system. Solvent, together with any remaining polymer, is recycled to feed. The foregoing process may be carried out at suitable polymerization temperatures such as 30 to 40° C. by operating under pressure in a series of lead lined pressure vessels.

Instead of vinyl chloride alone, a mixture of vinyl chloride and vinyl acetate in the ratio of 8 to 2 may be polymerized in the foregoing example.

Other combinations of monomers, type of catalysts, solvents, and anti-solvents for use in the foregoing type of processes are, for example:

Vinyl acetate with peroxide catalyst, benzene as a solvent, and normal butane as an anti-solvent; styrene with peroxide catalyst, benzene solvent and butane anti-solvent; isobutene with a Friedel-Crafts catalyst such as aluminum chloride, carbon disulfide as solvent, and an oxygenated organic compound such as ethyl ether as an anti-solvent.

Methyl methacrylate in methanol and water (1:1) or ethanol and water (95:5) may be used. Temperature differentials may be used with these solvents to aid or produce fractionation since the polymer is more soluble therein at elevated than at lower temperatures. Peroxide catalysts will accelerate polymerization. Other solvents are acetone, dioxane, ethylene chloride and ethyl acetate. Paraffinic hydrocarbons such as pentane or heptane or mixtures of paraffinic hydrocarbon are also useful as anti-solvents.

The process is applicable to polymerization of chloroprene, in a chlorinated hydrocarbon solvent such as carbon tetrachloride and a lower aliphatic alcohol, e. g., methyl or ethyl alcohols as an anti-solvent. Also, excess chloroprene may itself be utilized as the solvent and stepwise change in solvent power obtained by addition of ethyl alcohol as polymerization progresses to precipitate and fractionate the polymer as it is formed.

It should be observed that in some instances a higher polymer can be precipitated during polymerization from a solvent of low solvent power than from a solvent with higher solvent power. For example, a higher polymer of methyl methacrylate may be obtained from a 50:50 methanol-water solvent than from a 95:5 ethanol water solvent. This phenomenon is not understood, but in such cases the references to removal of higher and lower polymers from the respective zones in the various flow sheets as previously described should be reversed in order of occurrence. The general principles of the process still apply. Modifications in such cases may be made to adapt the systems to a particular situation or to alter yields of a particular polymer fraction, e. g., monomer feed may be introduced into the zone of lower solvent power rather than or in addition to the zone of higher solvent power to increase the yield of precipitate from the lower power solvent. The flow sheet of Figure V is adaptable to such modification.

Generally, it is desirable to select combinations of solvents and anti-solvents which produce a non-coalescing precipitate if the polymer is a normally solid one. Formation of gels or stable colloidal dispersions also introduce separation difficulties and may require centrifuging or other known special techniques such as a selective adsorption as in chromotographic separations.

Throughout the specific example so far described, only an anti-solvent has been used in combination with the selective solvent to effect polymerization and fractionation. The invention, however, has a broader principle, illustrated by the alteration of selectivity and solvent power with an auxiliary non-selective solvent. Figure VI illustrates one reactor or fractionator in such a process.

In Figure VI a highly selective solvent is admitted to reactor 150 near the top thereof through selective solvent inlet 151. An auxiliary non-selective solvent is also introduced into the reactor near the bottom of the reactor column through inlet line 152. A vertically elongated reactor preferably is utilized, and the rate of flow of the two solvents is regulated to avoid undue turbulence so that the concentration of non-selective solvent is greater at the bottom of the reactor column than it is in the top thereof and, conversely, so that the concentration of the selective solvent is higher in the top of reactor 150 than in the bottom thereof. The concentration of selective solvent thus diminishes as one progresses from the top toward the bottom of the column, as determined by equilibrium diffusion and flow rates in the continuously operating column. Thus, the mixed solvent body in the top of the column is more selective than in the bottom thereof, and equilibrium conditions are maintained by removing each solvent component from the column in a total amount equal to the rate of feed. It should be noted that some solvent will be removed with the precipitated polymer as well as in the mixed solvent outlet 154.

Polymer to be fractionated, or preferably monomer and catalyst, are introduced into the reactor and polymerization effected in the mixed solvent. As here shown, the monomer and catalyst feed are introduced by way of line 156 near the center of the column and between the inlet points for the selective solvent and auxiliary solvent. As the monomer and catalyst flow into the reactor column, polymerization occurs and insoluble polymer is precipitated. This insoluble polymer flows downwardly through the column and is re-extracted and more soluble components selectively dissolved in the bottom of the column where, as previously indicated, the mixed solvent has greater solvent power. The dissolved polymer then reverses and flows upwardly with the mixed solvent toward the top of the column where less soluble components are again precipitated by dilution with selective solvent and greater selectivity of the resulting mixture.

As previously noted, only a portion of the polymers initially formed will be precipitated at their point of formation. The remaining dissolved polymers will, accordingly, progress upwardly through the column and encounter a solvent mixture of greater and greater selectivity until the less soluble components are precipitated. These precipitated polymers will, in turn, start downwardly through the mixed solvent and be fractionated in the same manner as above described with respect to other precipitated polymers. Polymers which have been subjected to this repeated dissolution and precipitation finally collect in the bottom of reactor 150 and may be removed through line 155. Those polymers which are finally retained in the mixed solvent are likewise removed through solvent outlet 154.

The mixed solvent from outlet 154, together with dissolved polymers, may be treated in any suitable manner to effect separation of the solvents from each other and recover dissolved polymer. One effective method of treatment comprises adding a anti-solvent to precipitate at least the higher molecular weight polymer fractions. The remaining mixture may then be fractionated in suitable distillation apparatus and the respective solvents recycled to feed.

An example of a polymer and solvent system particularly adapted to the process of Figure VI comprises liquid sulfur dioxide as the selective solvent and benzene as the auxiliary non-selective solvent. These two solvent components are miscible and readily separable. Propylene or isobutene or mixed butenes may be polymerized in sulfur dioxide benzene solvent with boron fluoride as a catalyst. In such a system, the olefin polymer separates as a supernatant layer and it is accordingly necessary to invert the column of Figure VI when utilizing this particular chemical system.

It is believed that the significance of the terms "selective solvent," "anti-solvent" and "non-selective solvent" will be clear from the foregoing description and disclosure. Those skilled in the art will readily understand that a suitable selective solvent may vary widely in chemical composition so long as it meets the fundamental requirement of selectively dissolving polymer components in accordance with the desired characteristic of molecular weight, amount of cross linking, or the like. Similarly, a non-selective solvent is characterized by being substantially completely miscible, under the conditions of extraction, with the polymer being treated and preferably should also be miscible with the selective solvent. An anti-solvent, as the term itself denotes, is a diluent which causes precipitation of the polymer from the selective solvent and desirably is miscible with the selective solvent under the conditions of extraction. Anti-solvent must, of course, decrease the solvent power of the selective solvent and it may, in some instances, be soluble in the precipitated polymer. In this case its anti-solvent action is effected by decreasing solvent power of the selective solvent for the diluted polymer. In the appended claims the term "non-solvent" is utilized in lieu of and with an intended meaning equivalent to "anti-solvent" as hereinbefore illustrated and defined.

Although this invention has been illustrated profusely and various preferred processes have been described, numerous alterations utilizing the principles thereof will occur to those skilled in the art, and it is to be understood that the invention may be otherwise embodied or practiced within the scope of the appended claims.

We claim:

1. A process which comprises adding a polymerizable ethylenically unsaturated monomer to a normally liquid selective solvent which has limited solvent power for polymers of predetermined molecular weight, passing the dissolved compound through at least one polymerization zone, selectively precipitating a higher molecular weight polymer in a first zone while forming a lower molecular weight polymer of limited solubility in the selective solvent, separating the selectively precipitated higher molecular weight polymer from the reaction mixture, passing the remaining reaction mixture containing lower molecular weight to a second zone before the concentration of the lower molecular weight polymer has substantially exceeded its solubility limit in said first zone, precipitating the lower molecular weight polymer in the second zone in an amount at least equal to that formed in the first and second zones whereby concentration of the lower polymer does not build up in excess of its solubility limit in the first polymerization zone upon recycling the reaction mixture thereto, separating the precipitated lower polymer from the selective solvent, and returning residual polymer reaction mixture with selective solvent from the second to the first polymerization zone.

2. A process of forming and fractionating polymeric materials which comprises polymerizing an ethylenically unsaturated monomer in a normally liquid selective solvent to form a mixture of polymers having different solubilities in said solvent, selectively precipitating polymers of lower solubility in said selective solvent in a first solvent zone, separating said precipitated fraction of polymer from the solution of polymers having higher solubility in said solvent, passing said selective solvent polymer solution to a second solvent zone, precipitating a second polymer fraction by reducing the solvent power of said selective solvent in said second zone, separating said precipitated second polymer fraction, and thereafter polymerizing additional ethylenically unsaturated monomer in the selective solvent while it contains residual unseparated polymer.

3. A process as defined in claim 2, wherein said second polymer fraction is precipitated in said second zone by adding non-solvent to said solvent polymer solution.

4. A process of fractionating a mixture of polymers of ethylenically unsaturated monomers with a liquid selective solvent which comprises passing said selective solvent from a solvent inlet through a solvent extraction zone to a solvent outlet, contacting said mixture of polymers with the selective solvent in said extraction zone to form a solution of said polymers containing a polymer fraction of higher solubility in said solvent and a polymer of intermediate but limited solubility therein, precipitating dissolved polymer of intermediate solubility by decreasing the solvent power of the selective solvent by introducing a liquid solvent modifier in at least one portion of the extraction zone between said solvent inlet and outlet, refractionating said initially precipitated polymer by passing the same into a region of higher solvent power prior to removal from said extraction zone to dissolve those more soluble components of the precipitated polymer which tend to be carried out of solution by the precipitated less soluble polymer fraction, and thereafter removing the undissolved precipitate of said fractionated polymers from said solvent extraction zone.

5. A process as defined in claim 4, wherein said liquid solvent modifier is a non-solvent for said polymers.

6. A process of fractionating a mixture of polymers of ethylenically unsaturated monomers which comprises continuously passing a liquid solvent from a solvent inlet through a vertically elongated extraction zone to a solvent outlet, forming a polymer solution by polymerization of said ethylenically unsaturated monomer in said solvent body between said solvent inlet and outlet, fractionating said dissolved polymer by introducing a liquid solvent modifier in said extraction zone to selectively precipitate less soluble polymer components prior to removal of solvent through said solvent outlet, and separating said precipitated polymer.

7. A process as defined in claim 6, wherein said solvent modifier is a non-solvent for said polymers.

8. A process of fractionating a mixture of polymers of ethylenically unsaturated monomers which comprises continuously passing a relatively non-selective liquid solvent for said polymers from a first solvent inlet through a vertically elongated extraction zone to a solvent outlet, said first solvent inlet being near one end of the extraction zone and said solvent outlet being near an opposite end thereof, continuously forming a polymer solution by polymerization of said unsaturated monomer in said extraction zone, selectively precipitating less soluble polymer components by continuously introducing a relatively highly selective solvent into said extraction zone through a second solvent inlet positioned between said first inlet and said outlet, and withdrawing the precipitated polymer phase from said extraction zone.

9. A process of forming and fractionating a polymer of an ethylenically unsaturated monomer which comprises effecting polymerization of said monomer in a liquid sulfur dioxide solvent, selectively precipitating polymers of lower solubility in said selective solvent, separating said precipitated polymer fraction from the solution of polymers having higher solubility in said solvent, precipitating a second polymer fraction of intermediate solubility by reducing the solvent power of said liquid sulfur dioxide solvent, separating said precipitated second polymer fraction, and thereafter polymerizing additional ethylenically unsaturated monomer in the liquid sulfur dioxide solvent while it contains residual unseparated polymer.

10. In a process of controlling production and molecular weight of linear polymers, the steps of effecting polymerization of an ethylenically unsaturated monomer in a selective solvent for lower molecular weight polymers of said monomer, selectively precipitating higher molecular weight polymers from said solution substantially simultaneously with formation thereof, subjecting said precipitated polymer fraction to extraction with said selective solvent to selectively dissolve polymers of intermediate molecular weight initially precipitated with said higher polymers, separating said precipitated polymers from the selective solvent after said extraction, selectively precipitating polymers of intermediate molecular weight from the remaining solution by incorporation of a non-solvent, separating the second precipitate from the remaining solution of lower molecular weight polymers, and thereafter polymerizing additional ethylenically unsaturated monomer in said selective solvent while it contains residual unseparated polymer.

11. A process of treating a mixture of polymers formed by polymerization of ethylenically unsaturated monomers which comprises passing said mixed polymers through a plurality of liquid selective solvent extraction zones, fractionating said mixture by incorporating a non-solvent in said selective solvent to increase the selectivity of the solvent in a second as compared with a first extraction zone, and increasing the ratio of selective solvent to polymer in said second zone by dilution with solvent.

12. A process of fractionating linear polymers of ethylenically unsaturated monomers which comprises forming a solution in a liquid selective solvent of a mixture of linear polymers formed by polymerization of ethylenically unsaturated monomers and differing in molecular weight, continuously flowing said solvent with dissolved polymers in one direction through a treating zone, forming a region of higher and a region of lower solvent power for higher molecular weight linear polymers of said mixture by introducing a liquid solvent modifier in at least one portion of the continuously flowing body of solvent in the treating zone, precipitating a part of the linear polymer in said region of lower solvent power, passing the precipitated polymer from said region of lower solvent power into said region of higher solvent power whereby said precipitated portion is re-extracted to remove more soluble components which tend to precipitate with said higher molecular weight polymers and whereby said redissolved fraction is carried in said solution back to the region of decreased solvent power and refractionated, and removing undissolved fractionated polymers from said extraction zone.

13. A process which comprises polymerizing an ethylenically unsaturated monomer in a solvent to form a first polymer fraction relatively insoluble in said solvent, a second polymer fraction of relatively limited solubility dissolved in said solvent, and a third more soluble polymer fraction; forming a precipitated first polymer phase during said polymerization and a solvent phase containing said second and third polymer fractions; separating said first polymer phase from said solvent phase before the concentration of said second polymer fraction has substantially exceeded its solubility limit in said solvent; thereafter precipitating said polymers of said second fraction to form a second polymer phase and a second solvent phase containing said third more soluble polymer fraction, said second polymer fraction being precipitated in an amount at least equal to its accumulation rate in the polymerization cycle whereby concentration thereof does not build up in excess of its solubility limit and cause precipitation with first polymer fractions upon repeated polymerization in said solvent; separating the precipitated second polymer phase from said second solvent phase, and polymerizing additional ethylenically unsaturated monomer in said second solvent phase while it contains residual unseparated polymer of said third more soluble polymer fraction.

WILLIAM E. ELWELL.
ALVAH L. SNOW.

REFERENCES CITED

The following references are of record in the file of this patent:

UNITED STATES PATENTS

| Number | Name | Date |
|---|---|---|
| 2,135,443 | Strain | Nov. 1, 1938 |
| 2,388,160 | Krase | Oct. 30, 1945 |
| 2,436,926 | Jacobson | Mar. 2, 1948 |

OTHER REFERENCES

Badger and McCabe, Elements of Chem. Eng., pages 420–424; 432–437. McGraw-Hill, N. Y. (1936).

Blease Trans. Faraday Soc., vol. 37 (1941), pp. 571–580.

Mark et al., High Polymeric Reactions, vol. 3, pp. 51, 52, 57, 60, 61 and 62; Interscience Publishers, Inc., New York (1941).